Nov. 17, 1925.                                                              1,561,828
W. D. CHAMBERLAND
MILK PAIL HOLDER
Filed Oct. 8, 1923
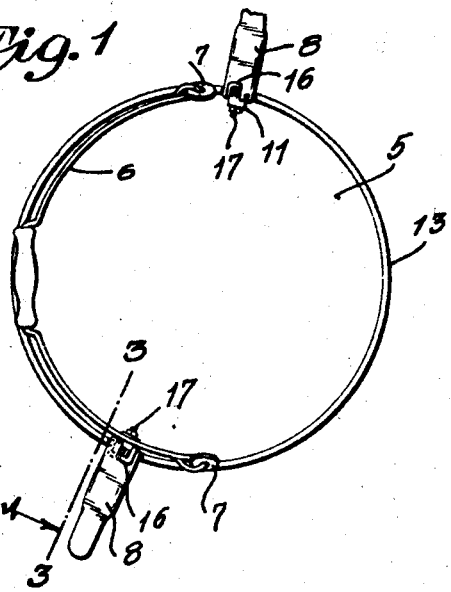
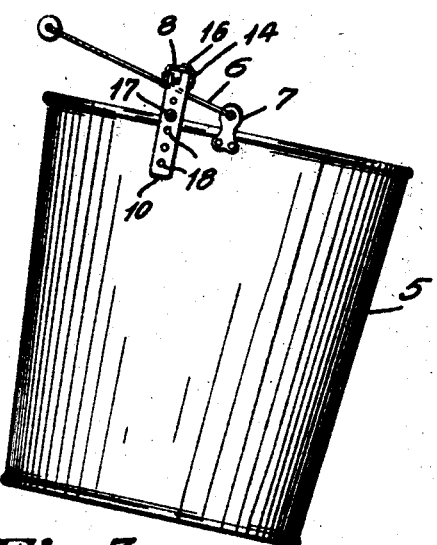
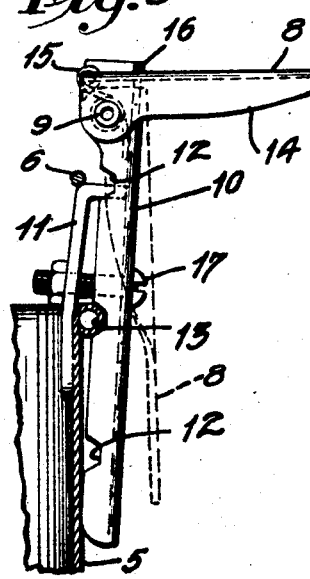
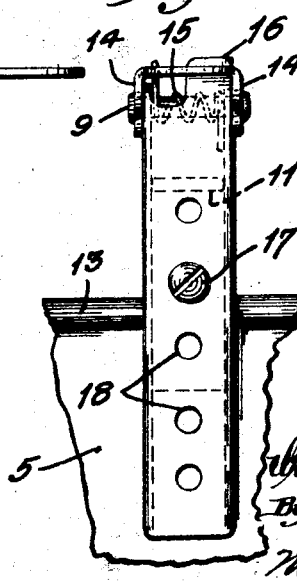
Inventor
William D. Chamberland
By his Attorneys
Merchant & Rigor Patented Nov. 17, 1925.

1,561,828

UNITED STATES PATENT OFFICE.

WILLIAM D. CHAMBERLAND, OF MINNEAPOLIS, MINNESOTA.

MILK-PAIL HOLDER.

Application filed October 8, 1923. Serial No. 667,173.

*To all whom it may concern:*

Be it known that I, WILLIAM D. CHAMBERLAND, a citizen of the United States, residing at Minneapolis, in the county of Hennepin and State of Minnesota, have invented certain new and useful Improvements in Milk-Pail Holders; and I do hereby declare the following to be a full, clear, and exact description of the invention, such as will enable others skilled in the art to which it appertains to make and use the same.

My invention relates to a milk pail holder adapted to support a milk pail from the knees of a milker while in a sitting position, thus relieving all knee strain required to hold a milk pail between the knees by pressure thereon.

Said invention has for one of its objects to provide such a holder that will automatically fold into an inoperative position as the milk pail is lifted by its bail from between the knees of the milker so that said holder is entirely out of the way.

A further object of the invention is to provide a milk pail holder that can be vertically adjusted on a milk pail so as to hold the pail at the required height. A still further object of the invention is to provide a milk pail holder having independent members that may be circumferentially adjusted on a milk pail so that the same may be supported with its top in a horizontal position or in different inclined positions.

The invention still further provides a holder adapted to support the bail of a milk pail with its intermediate portion above the rim thereof and at either side of the pail, so that the same may be easily grasped by a milker.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of a milk pail having the improved holder applied thereto;

Fig. 2 is a side elevation of the same;

Fig. 3 is a view in elevation with some parts sectioned on the line 3—3 of Fig. 1; and Fig. 4 is an outside elevation of the parts shown in Fig. 3.

The numeral 5 indicates a milk pail having a bail 6 attached thereto by a pair of diametrically opposite ears 7. The improved milk pail holder includes a pair of oppositely and outwardly extended arms 8 adapted to rest upon the knees of a milker. These arms 8 are pivoted at 9 to the upper ends of the channel uprights 10 detachably secured to the pail 5 by clamps 11 for vertical adjustment and circumferential adjustment thereon. Each upright 10 is in the form of a channel having in its sides longitudinally spaced pairs of notches 12, any one of which is adapted to receive the rolled edge portion 13 of the milk pail 5. These notches 12 are of such size as to receive rims of different diameters and to permit the lower end portions of the sides of the uprights 10 to bear against the outer face of the pail 5.

The arms 8 at their inner end portions are provided with downturned reinforcing flanges 14 that also afford ears that embrace the sides of the channel uprights 10, and are connected thereto by the pivots 9. Coiled springs 15 encircling the pivots 9 have one of their ends anchored to the inner end of the arms 8, and their other ends engage the uprights 10 as bases of resistance, and which springs are under strain to fold the arms 8 onto the uprights 10, as indicated by broken lines in Fig. 3.

The arms 8 have in their inner ends notches arranged to receive stops 16 on the uprights 10 to be engaged by said arms to limit their lifting movement and hold the same in horizontal positions extending outward and away from the pail 5 at substantially diametrically opposite points.

Each clamp 11 is in the form of a flat bar connected to one of the channel uprights 10 by a nut-equipped bolt 17 which extends through a bore in the intermediate portion of said clamp and any one of a plurality of longitudinally spaced bores 18 in said upright 10. The upper ends of the clamps 11 are bent laterally, extend between the sides of the channel uprights 10, and bear upon the inner faces thereof as bases of resistance. The clamps 11, below the bolts 17, are slightly bent laterally so as to extend substantially parallel to the sides of the inner face of the milk pail 5 and bear thereupon, as shown in Fig. 3.

Obviously, the notches 12 permit the uprights 10 to be secured to the pail so as to support the arms 8 at different elevations thereabove. When the upper notches 12 are used, the clamps 11 are dispensed with and the nut-equipped bolts extend through holes (not shown) formed in the pail. These notches 12 and clamps 11 also permit the uprights to be independently circumferentially adjusted on the pail, and when adjusted to diametrically opposite points will support the pail with its top in a horizontal position, or when adjusted as indicated in Fig. 1, will support the pail in an inclined position as indicated in Fig. 2. This inclination may be varied, at will, by circumferentially adjusting one of the uprights in respect to the other. Preferably, the uprights 10 are applied to a pail on opposite sides of the ears 7, as indicated in Fig. 1, and when thus applied, the clamps 11 will afford stops, one of which is always operative to support the bail 6 in an inclined position, as shown in Fig. 2, when turned with its handle to either side of the pail.

The tension of the springs 15 is such that the weight of the empty pail 5 will hold the arms 8 in a horizontal position when the outer end portions thereof are supported on the knees of a milker. The stop-acting clamps 11 for the bail 6 support the bail with its handle so that the same may be easily grasped by the milker at all times.

The above described invention may be very quickly and easily applied to a milk pail, and in case the pail wears out, the attachment may be very easily removed and applied to a new pail.

What I claim is:

1. A milk pail holder having a channel upright having in its sides notches adapted to receive the rolled rim of a milk pail, an outwardly extended arm pivoted to the upright, a clamp for attaching the upright to the milk pail, said clamp comprising an upright bar, the upper end of which is arranged to engage the upright and the lower end portion of which is arranged to overlap the inner wall of the milk pail, and a draw bolt connecting said bar to the upright above the notches therein and arranged to hold the upright with the lower ends of its sides in contact with the milk pail and its notches seated on the rolled rim thereof, said notches being of such depth as to hold the sides of the upright spaced from the side of the milk pail.

2. The structure defined in claim 1 in which the upright bar of the clamp affords a stop for the bail of the milk pail and holds the same in an inclined position in respect to the top of the milk pail.

3. A milk pail holder comprising a channel upright having in its sides vertically spaced notches adapted to receive the rolled upper edge of a milk pail, an arm pivoted to the upright, a spring operative on the arm to fold the same onto the upright, and a clamp for attaching the upright to the milk pail, said clamp being vertically adjustable on the upright.

4. A milk pail holder comprising a channel upright having in its sides vertically spaced notches adapted to receive the rolled upper edge of a milk pail, an arm pivoted to the upright, a spring operative on the arm to fold the same onto the upright, and a clamp for attaching the upright to the milk pail, said clamp comprising an upright bar, the upper end of which extends into the channel upright and bears thereagainst, and a draw bolt intermediately connecting said bar to said upright.

5. A milk pail holder comprising a channel upright having in its sides vertically spaced notches adapted to receive the rolled upper edge of a milk pail, an arm pivoted to the upright, a spring operative on the arm to fold the same onto the upright, and a clamp for attaching the upright to the milk pail, said clamp comprising an upright bar, the upper end of which extends into the channel upright and bears thereagainst, and a draw bolt intermediately connecting said bar to said upright, said upright bar affording a stop for the bail of the milk pail and arranged to hold the same in an inclined position in respect to the top of the milk pail.

In testimony whereof I affix my signature.

WILLIAM D. CHAMBERLAND.